Sept. 16, 1969  A. W. MESS  3,466,808
GRINDER FOR TRUING AND SMOOTHING THE TIRES OF THE MAMMOTH ROTARY
KILNS USED IN THE MANUFACTURE OF CEMENT AND SIMILAR PURPOSES
Filed July 21, 1967  2 Sheets-Sheet 1

INVENTOR.
ALFRED W. MESS
BY James C. Nemmers
ATTORNEY

Sept. 16, 1969 A. W. MESS 3,466,808
GRINDER FOR TRUING AND SMOOTHING THE TIRES OF THE MAMMOTH ROTARY
KILNS USED IN THE MANUFACTURE OF CEMENT AND SIMILAR PURPOSES
Filed July 21, 1967 2 Sheets-Sheet 2
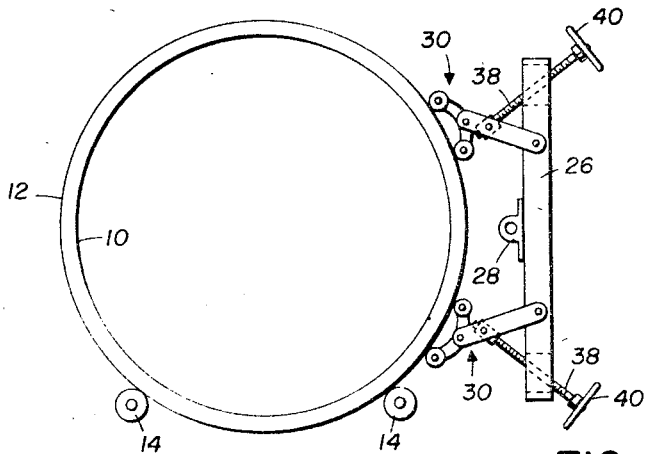
FIG 3
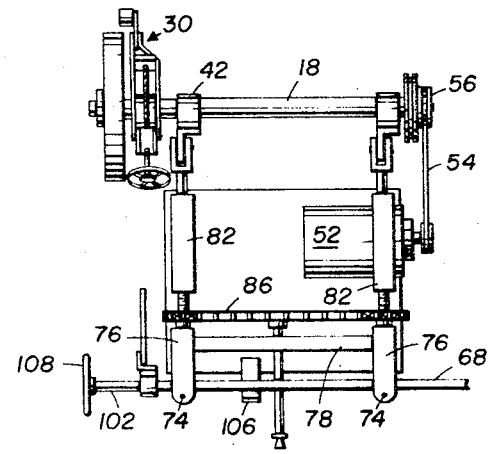
FIG 4
 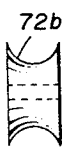  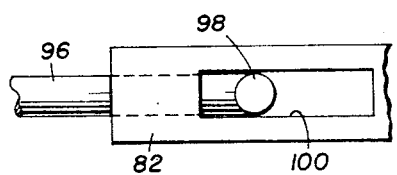
FIG 5  FIG 6
INVENTOR.
ALFRED W. MESS
BY
ATTORNEY

United States Patent Office 3,466,808
Patented Sept. 16, 1969

3,466,808
GRINDER FOR TRUING AND SMOOTHING THE TIRES OF THE MAMMOTH ROTARY KILNS USED IN THE MANUFACTURE OF CEMENT AND SIMILAR PURPOSES
Alfred W. Mess, Box 14, Le Claire, Iowa 52753
Continuation-in-part of application Ser. No. 347,409, Feb. 26, 1964. This application July 21, 1967, Ser. No. 655,238
Int. Cl. B24b 19/06
U.S. Cl. 51—99                 16 Claims

ABSTRACT OF THE DISCLOSURE

An improved supporting structure for an abrasive grinding wheel that enables the wheel to be used to grind the outer surface of a large circular or cylindrical object as the object rotates about an axis that is not a fixed central axis.

Reference to related application

This application is a continuation-in-part of my earlier filed copending application, Ser. No. 347,409, which was filed on Feb. 26, 1964 and is now abandoned.

Background of the invention

This invention relates to an apparatus for reconditioning by finishing and truing, large diameter, load-bearing circular supports, such as the "tires" found upon kilns and driers used in manufacturing cement, pulverized lime and similar materials from limestone or other suitable rocks. The invention is primarily designed for reconditioning, turning up and smoothing the periphery of the large-diameter, load-bearing metal rings or tires that support tubular-like kilns which are commonly three to four hundred feet or more in length and ten to twenty feet or more in diameter. These tires are usually about several inches in thickness and can be two or more feet in width, and they are made of suitable metal molded or machined into rings around the periphery of the kiln at spaced distances of 50–60 feet, for example. As commonly used in the cement and other chemical industries, these large kilns are heated to high temperatures and are continuously rotated over extended periods of time. The tires each engage a pair of roller mountings which serve as the supports for the kiln as it is rotated. Thus, the kilns do not necessarily rotate about a fixed central axis. Over extended periods of use, the tires become irregularly worn, and as they do so, their condition rapidly deteriorates. The supporting rollers also will wear rapidly and worsen the condition. Until the present invention, the only solution was to replace the tires which necessitated shutting down of the kiln for several weeks with the resulting loss of use of the equipment in addition to the high cost of replacing the tires.

Summary of the invention

My novel apparatus can be built as a permanent part of the kiln assembly, or, preferably, it is built and used as a portable unit separable from the kiln and movable from one tire to another and from one kiln to another. The apparatus consists basically of an abrasive wheel and a "triple tandem" support which can be adjusted to control the depth of cut of the abrasive wheel. The apparatus works on an elimination principle, the abrasive wheel traveling over low places without engaging the tire to be reconditioned, but the triple tandem support allows the wheel to cut, trim or reduce the high spots, if any, as well as smoothing the entire outer surface of the tire and making it nearly perfectly round.

Brief description of the drawings

FIG. 3 is an end view of a portion of the apparatus shown with the abrasive wheel removed in order more clearly to illustrate the triple tandem support structure;

FIG. 4 is a plan view of my novel apparatus;

FIG. 5 shows three types of supporting wheels for my novel apparatus; and

FIG. 6 is an enlarged view of a portion of the supporting structure for the grinding apparatus.

Description of the preferred embodiment

Figure 1:
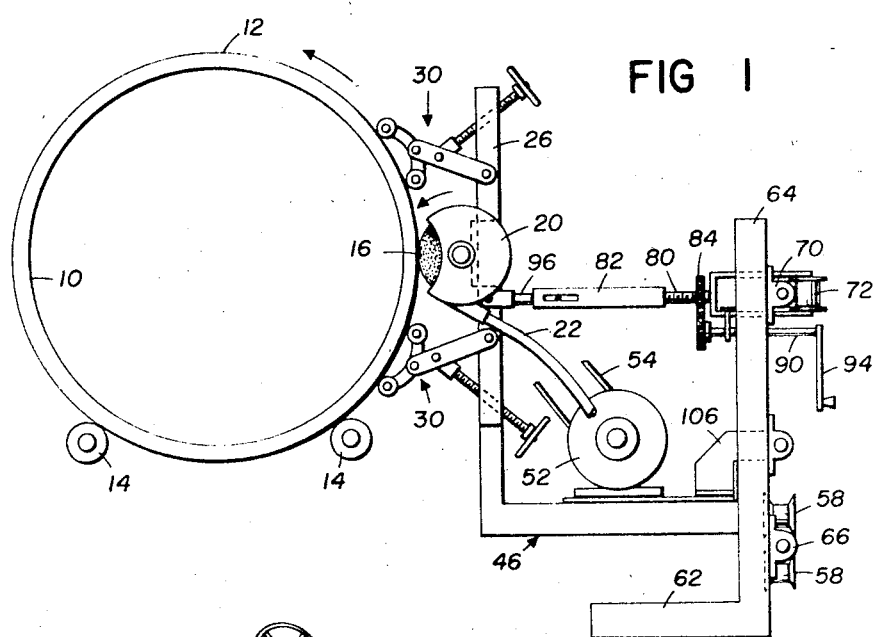
FIG. 1 is an end view of my apparatus mounted adjacent one side of a kiln with the tandem carriers bearing upon the outer periphery of the tire or other surface to be reconditioned.
Figure 2:
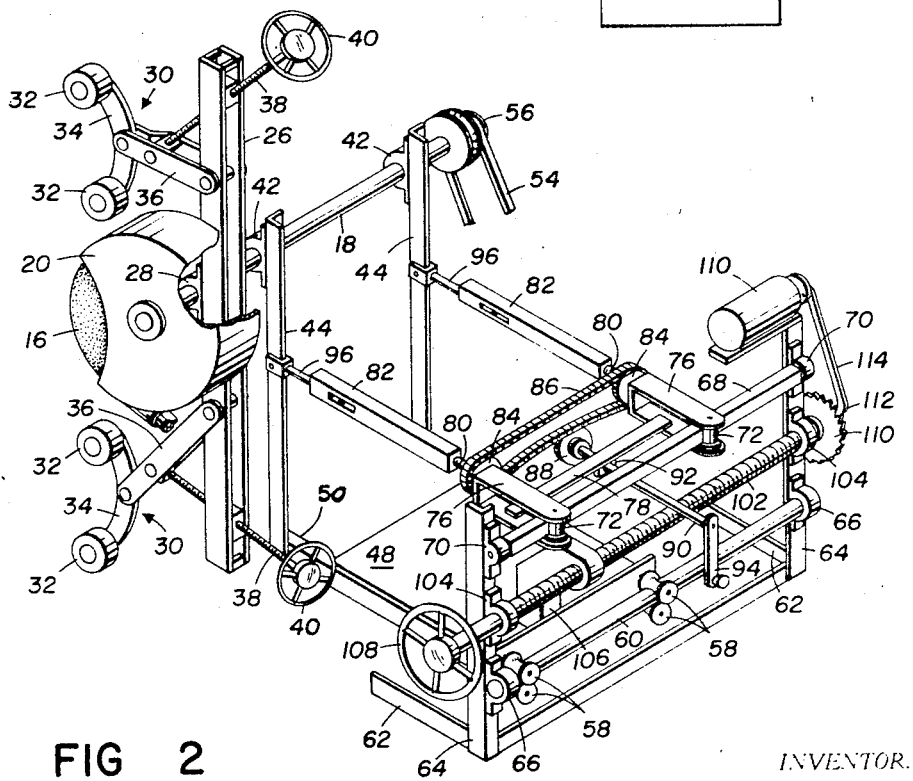
FIG. 2 is a perspective view of my novel apparatus with some of the components not shown in order to more clearly show certain details.

Referring now to the drawings, there is indicated a circular article, such as the tire 10 of a kiln, the outer surface 12 of which is to be reconditioned. The kiln is supported for rotation by rollers 14 which engage the tire 10, and thus the kiln rotates about an axis that is not fixed. The rollers 14 are rotatably mounted on stationary supports (not shown) at the desired height. My novel apparatus is mounted on a stationary support (not shown) adjacent the surface 12 of the kiln to be reconditioned. Although the apparatus will operate in other positions, it preferably is mounted in the relative position indicated in FIG. 1 with the abrasive wheel 16 engageable with the outer surface 12 at approximately the point where a horizontal diameter intersects the surface to be reconditioned. The abrasive wheel 16 is mounted on and turnable with a drive shaft 18 and preferably is provided with a protective cover 20 which can also serve to collect material resulting from the grinding and exhaust such material through a line 22 connected to a vacuum source (not shown). The wheel 16 can be of any suitable abrasive material capable of cutting the material of the surface to be reconditioned.

The master tandem assembly, indicated generally by the reference numeral 24, includes an upright member 26 that is pivotally mounted adjacent wheel 16 on shaft 18 by means of bearing 28. The member 26 provides a support for a pair of tandem carriers or trunnions, each indicated generally by the reference numeral 30. Each carrier 30 has a pair of wheels or rollers 32 connected by member 34 which is pivotally mounted on one end of a bifurcated arm 36 the other end of which is pivotally connected to the upright member 26. Thus, each carrier 30 is mounted as a unit tandem-fashion. Each carrier 30 is adjustably positioned by means of a threaded rod 38 one end of which is turnably connected to arm 36 and the other end of which has a hand wheel 40. The rod 38 is threadedly connected to the upright member 26 so that when turned the carrier 30 will be moved relative to the member 26. Thus, the threaded rod 38 together with the tandem carriers 30 provide one of the adjustments for properly positioning the abrasive wheel 16 to vary the depth of cut by the wheel 16.

The drive shaft 18, upon which the tandem assembly 24 is pivotally mounted, is turnable in bearings 42 which are secured to the parallel upright arms 44 of L-shaped frame members 46. A platform 48 extends between horizontal arms 50 of equal lengths and provides a support for a motor 52 which is connected by a belt 54 to a pulley 56 affixed to the outer end of shaft 18. At the rear of platform 48 there are provided two pair of supporting wheels 58, each wheel being turnable about a horizontal axis. The wheels 58 engage a stationary traversing rod 60, as will be described more fully hereinafter.

A second L-shaped frame 62 provides a mounting for securing my novel apparatus to suitable stationary supporting structure (not shown) and provides the main fixed support for the entire apparatus. The stationary supporting structure has not been shown because it will depend upon the particular situation encountered and forms no part of the invention. The vertical or upright members 64 of the main frame 62 provide for the mounting of suitable bearings 66 in which the traversing rod 60 is free to turn. An upper traversing rod 68 is also turnably supported on the upright members 64 of the frame 62 by means of bearings 70. A second pair of supporting wheels 72 are each turnable about a vertical axis, and wheels 72 engage the upper traversing rod 68 along its back side. The supporting wheels 72 are turnable on pins or axles 74 (FIG. 4) extending through the ends of bifurcated arms 76, which are connected by a cross member 78. At its other end, each arm 76 has extending longitudinally therefrom a rod 80 which is freely turnable with respect to arm 76. Each rod 80 is threaded into the end of a tubular member 82 which is fixed from turning relative to the rod 80. A sprocket 84 is keyed or otherwise suitably affixed to each rod 80 adjacent the arm 76. Sprockets 84 are interconnected by a chain 86 which is engaged by a drive sprocket 88 affixed to the end of a shaft 90 that is turnable in a bearing 92 secured to cross member 78. A crank 94 is affixed to the other end of shaft 90 and when turned will cause the sprockets 84 to turn thereby threading the rods 80 into or out of members 82. This action changes the relative distance between the fixed main frame 62 and the tubular members 82, and provides a master depth control used primarily as a finish cut control. There is slidingly received in the outer end of each member 82 a rod 96 which is pivotally connected to one of the arms 44. Each rod 96 will slide longitudinally relative to its respective member 82 within a distance limited by movement of a stop pin 98 in longitudinal slot 100 formed in member 82 (FIG. 6). The stop pin 98 is, of course, affixed to the end of rod 96 inside of the member 82. Thus, the arms 44 which carry the wheel 16 and tandem assembly 24 are free to move within this limited distance toward and away from the surface 12 that is being reconditioned. In use, the weight of the unit will exert a sufficient pressure between the wheel 16 and the surface 12 to grind the irregularities on the surface while permitting the unit to move slightly away from what would otherwise be a fixed position. Since the kilns for which my apparatus is designed do not rotate about a fixed central axis, this feature allows the unit to move slightly while still exerting grinding pressure and thus greatly minimizes breakage of the abrasive wheels. If desired, a fluid cylinder (not shown) can be used to exert a controlled pressure on the tandem assembly 24.

Obviously, as the distance between the upper traversing rod 68 and the upright frame members 44 is varied, the rod 68 will turn slightly as will the lower traversing rod 60. Thus, this construction, utilizing the supporting wheels and traversing rods, permits pivotal movement of the grinding unit and adjustment of the position of the apparatus for purposes of depth control.

Since kiln tires and other surfaces to be reconditioned are often two or more feet in width, the wheel 16 obviously must be traversed back and forth across the surface. The construction described above utilizing the traversing rods 60 and 68 and supporting wheels 58 and 72 permit the entire apparatus to be moved laterally. Continuous movement can be provided manually, or automatically if desired. A threaded traversing rod 102 is turnable in bearings 104 mounted on the uprights 64 of frame 62. The threaded rod 102 is positioned parallel to the traverse rods 60 and 68 and is thus oriented parallel to the axis of wheel 16. Rod 102 is threaded through a control arm 106 affixed to the platform 48 or other supporting structure of the apparatus. If desired, arm 106 can be connected by a vertical telescoping bar (not shown) to the arms 76, which are operatively connected to the upper traversing rod 68. This provides increased stability for the entire unit. At one end of the threaded traversing rod 102 there is provided a hand wheel 108 and at the other end there is a ratchet wheel 110 which is turned intermittently through a small angle each time one of the notches on the wheel 110 is engaged by the pawl 112 on the end of an arm 114. Arm 114 is eccentrically mounted on the shaft of a motor 116 which is continuously driven during the time it is desired to traverse the surface 12 with wheel 16. Thus, during each revolution of the motor 116, the arm 114 will engage a notch on the ratchet wheel 110, turn the traversing rod 102 slightly and advance the assembly carrying the wheel 16 gradually across the surface 12. The hand wheel 108 can be used to manually traverse and also to return the wheel 16 to a "start" position after each pass is made automatically by the ratchet wheel 110. Obviously, provision can be made for power-driven traverse in either lateral direction or both directions.

In FIG. 5 we have shown several variations of supporting wheels 58 and 72 which might be utilized. These wheels are identified by reference numerals 72a and 72b and 72c. A traversing rod of corresponding cross-sectional shape, such as circular, hexagonal, etc., would be utilized. The supporting wheels provide proper tracking on the rods, and since the traversing rods are turnable, pivoting of the apparatus to the extent necessary is also provided.

In operation, in order to re-establish the axis of the rotating kiln, my novel apparatus is mounted adjacent to the surface to be reconditioned with the traversing rods 60 and 68 parallel to said axis. The weight of the grinding assembly will extend the rod 96 to the maximum point limited by stop pin 98. The crank 94 may then be turned to move the wheel 16 into engagement with the surface 12. Free movement of the rod 96 within the tubular member 82 (limited only by pin 98 in slot 11) will compensate for out of roundness of the surface 12 without breakage of the wheel 16. As the large irregularities in the surface 12 are corrected, the adjustment provided in each of the carriers 30 is also used to progressively take off material and re-establish roundness of the surface 12. To remove any taper that is usually created in the tires forming surface 12, the traversing mechanism is employed as the grinding of the surface progresses. Of course, as previously indicated, the traversing rods 60 and 68 must be positioned parallel to the axis of the kiln so that the grinding by wheel 16 will ultimately result in a surface also parallel to that axis. The construction of the unit with the traversing rods 60 and 68 turnably mounted allows the entire grinding assembly to pivot as both the grinding wheel 16 and surface 12 are worn down. Adjustments are continuously made with hand wheels 40 and crank 94 as the reconditioning progresses.

If, as occasionally occurs during the grinding process, the grinding assembly is lifted by the revolving kiln, the slotted linkage provided by the rod 96 and tubular member 82 will allow the grinding wheel 16 to disengage itself sufficiently to avoid breakage or overloading of the wheel 16.

The apparatus thus will effectively produce a flat, round surface which will allow the kiln to revolve smoothly. My novel apparatus can also be used to recondition the smaller supporting wheel 14 for the kiln since these also become irregularly worn as the kiln tires become out of round. It will be obvious to those skilled in the art that other uses can be made of my invention and that various modifications may be made in the size, shape and material of the different parts without departing from the spirit and scope of my invention. I do not intend, however, to limit my claims to the precise forms shown in the drawings but rather the scope of my invention shall be limited only by the following claims and their equivalents:

I claim:
1. An apparatus for reconditio ing the peripheral surface of a circular-shaped article that is rotatable, said apparatus comprising first support means, a reconditioning wheel rotatably mounted on said first support means, a pair of carriers each pivotally mounted on said first support means, said carriers being spaced-apart along a line perpendicular to the axis of rotation of said wheel, each of said carriers including a pair of spaced-apart wheels pivotally mounted intermediate their axes in tandem fashion and adapted to engage said peripheral surface, the axis of rotation of said reconditioning wheel being located on said first support means intermediate said carriers, means to rotate said reconditioning wheel, and second support means, said first support means being pivotally mounted intermediate said carriers on said second support means.

2. The apparatus of claim 1 in which the position of each pair of said spaced-apart wheels is adjustable relative to said first-support means to vary the position of said reconditioning wheel relative to said peripheral surface.

3. The apparatus of claim 1 in which each of said carriers includes an arm pivotally mounted at one end on said first support means, a pair of said spaced-apart wheels being pivotally mounted on the other end of each of said arms, and a threaded member interconnects said first support means and each of said arms to provide for independent adjustment of said tandem wheels.

4. The apparatus of claim 1 in which said reconditioning wheel is rotatable about an axis equally spaced from said carriers.

5. The apparatus of claim 1 in which said reconditioning wheel is rotatable about an axis coincidental with the pivot point of said first support means on said second support means.

6. The apparatus of claim 1 in which there is provided a third support means that is stationary, and said second support means is mouted on said third support means in such a way that said second support means is movable relative to said second support means toward and away from said peripheral surface.

7. The apparatus of claim 6 in which means is provided to selectively adjust the position of said second support means relative to said third support means and thereby provide for varying the position of said reconditioning wheel relative to said peripheral surface.

8. The apparatus of claim 1 in which there is provided a third support means that is stationary, and said second support means is mounted on said third support means in such a way that said second support means is movable transversely across said peripheral surface.

9. The apparatus of claim 8 in which means is provided to move said second support means and thus said reconditioning wheel transversely across said peripheral surface.

10. The apparatus of claim 1 in which first support means includes a rigid support frame member, one of said carriers being mounted on said frame near each end thereof, each carrier having an arm pivotally mounted at one end on said frame, each of said pair of wheels having parallel axes which are substantially parallel to the axis of rotation of said circular-shaped article, a shaft pivotally connecting said frame intermediate its ends to said second support means about an axis substantially parallel to the axes of said tandem wheels and said reconditioning wheel being rotatably mounted on said shaft between said carriers about an axis substantially parallel to the axes of said tandem wheels.

11. The apparatus of claim 10 in which adjustable means interconnects each of said arms and said frame so that the position of each pair of tandem wheels can be varied relative to said reconditioning wheel.

12. An apparatus for reconditioning the peripheral surface of a circular-shaped article that is rotatable, said apparatus comprising a rigid support frame, a carrier mounted on said frame at opposite ends thereof, each carrier including a pair of wheels the axes of which are rigidly connected, each pair of wheels being pivotally mounted intermediate their axes in tandem fashion, movable support means, means pivotally mounting said frame on said movable support means intermediate said carriers about an axis substantially parallel to the axes of said carrier wheel, a reconditioning wheel rotatably mounted on said frame about an axis coincidental with the pivotal axis of said frame, means to drive said reconditioning wheel, stationary support means, and means interconnecting said movable and stationary support means in a manner providing for limited movement of said movable support means relative to said stationary support means in a direction substantially transverse to the rotative axis of said reconditioning wheel.

13. The apparatus of claim 12 in which means is provided to adjustably position each pair of said tandem wheels.

14. The apparatus of claim 12 in which depth regulating means is provided to adjustably position said reconditioning wheel transversely to its rotative axis and with respect to said stationary support means while providing for limited relative movement in said transverse direction between said reconditioning wheel and said stationary support means at any position.

15. The apparatus of claim 14 in which said depth regulating means includes a first member connected at one end to said stationary support means, and a second member operatively connected to the other end of said first member and movable relative thereto within a limited distance, the other end of said second member being connected to said movable support means.

16. The apparatus of claim 12 in which means is provided for movement of said movable support means carrying said reconditioning wheel with respect to said stationary support means in a direction parallel to the rotative axis of said reconditioning wheel.

References Cited

UNITED STATES PATENTS

| 1,889,838 | 12/1932 | Norman | 51—254 |
| 2,885,837 | 5/1959 | Freitag | 51—242 |
| 3,130,524 | 4/1964 | Nelson et al. | 51—241 |

FOREIGN PATENTS

| 135,211 | 11/1933 | Austria. |
| 497,773 | 12/1919 | France. |
| 646,210 | 6/1937 | Germany. |
| 308,962 | 4/1929 | Great Britain. |

OTHELL M. SIMPSON, Primary Examiner

U.S. Cl. X.R.

51—254